United States Patent [19]
Jentzsch et al.

[11] 3,965,967
[45] June 29, 1976

[54] HIGH STRENGTH PORTABLE CABLE CROSSOVER FOR HIGH TONNAGE EARTH MOVING VEHICLES

[75] Inventors: David P. Jentzsch, Sandy; Hyrum T. Anderson; Lee J. Olsen, both of Salt Lake City, all of Utah

[73] Assignee: Rubber Engineering, Inc., Salt Lake City, Utah

[22] Filed: Feb. 12, 1975

[21] Appl. No.: 549,234

Related U.S. Application Data

[62] Division of Ser. No. 383,644, July 30, 1973, Pat. No. 3,888,186.

[52] U.S. Cl. ..................................... 104/275; 37/1; 174/70 C
[51] Int. Cl.² .......................................... E01B 7/28
[58] Field of Search .................. 104/275, 277; 37/1, 37/DIG. 1; 174/70 C, 72 C, 97, 135

[56] References Cited
UNITED STATES PATENTS

| | | | |
|---|---|---|---|
| 1,914,830 | 6/1933 | Kostohris | 104/275 |
| 2,636,520 | 4/1953 | Geist et al. | 174/70 C X |
| 2,963,676 | 12/1960 | Sneesby et al. | 174/70 C X |

FOREIGN PATENTS OR APPLICATIONS

| | | | |
|---|---|---|---|
| 240,556 | 10/1925 | United Kingdom | 37/DIG. 1 |

*Primary Examiner*—L. J. Paperner
*Assistant Examiner*—Randolph A. Reese
*Attorney, Agent, or Firm*—Lynn G. Foster

[57] ABSTRACT

A portable crossover of high strength elastomeric material, such as polyurethane resin, which is placed upon the ground in the path of a high tonnage earth moving vehicle. A cable, supplying electrical power to an electric excavator, is placed in a U-shaped channel or recess and a strip insert of elastomeric material is placed over the cable thereby preventing debris from damaging the cable or causing subsequent removal of the cable to be difficult. The crossover is shaped particularly to provide ramps on each side for the vehicle to engage and has central load-carrying shoulders which restrict central deflection of the crossover, under the wheels of the vehicle, such that vehicle load is not imposed on the cable. A towbar, of rigid plate material or a cable or chain fixedly joins one end of the crossover whereby a tow vehicle may connect to and relocate a crossover from place to place as needed, upon removal of the cable from the channel.

1 Claim, 7 Drawing Figures

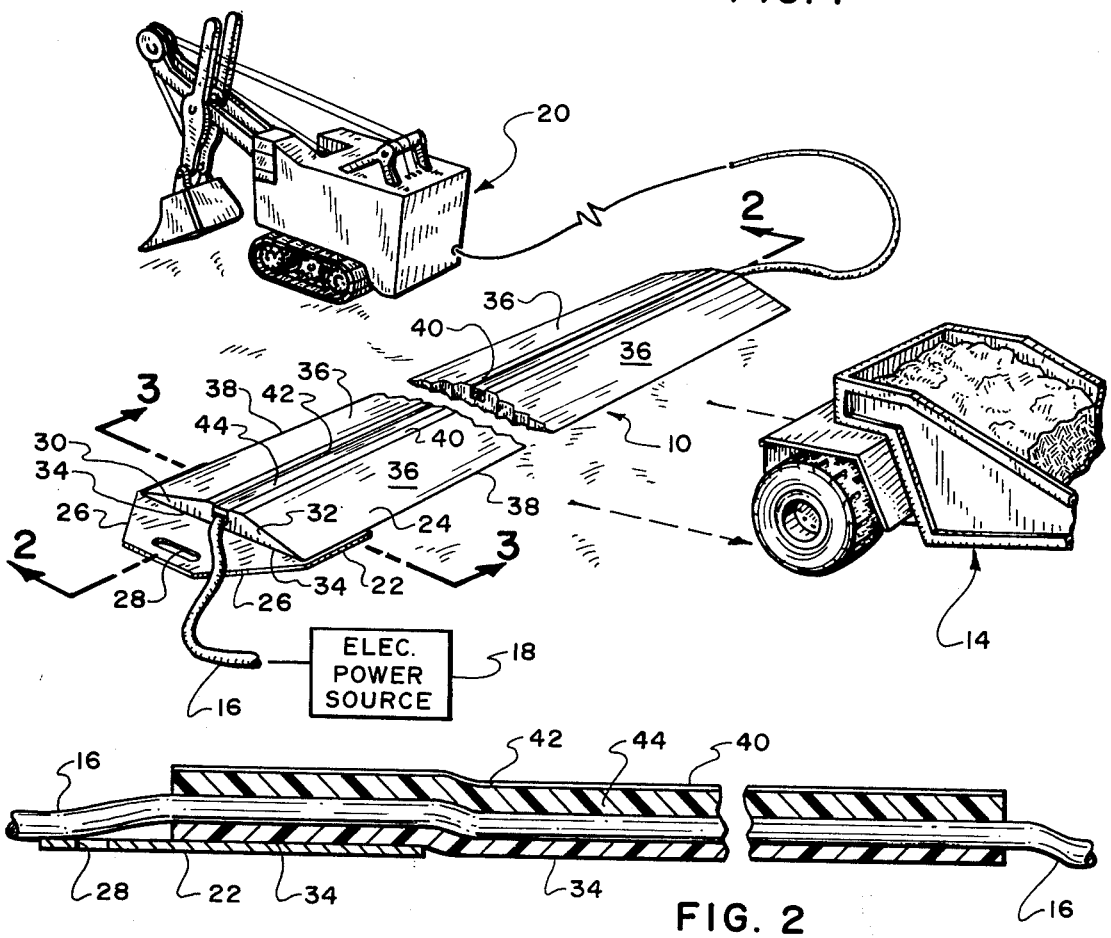
FIG. 1
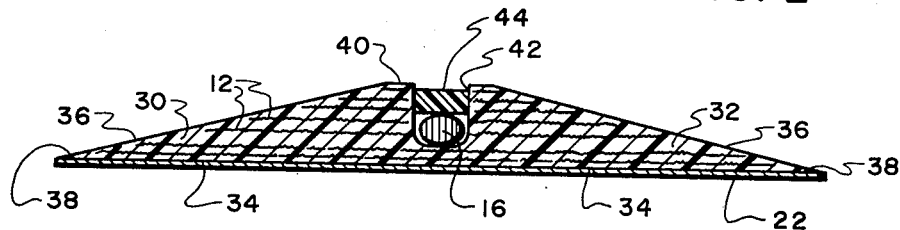
FIG. 2
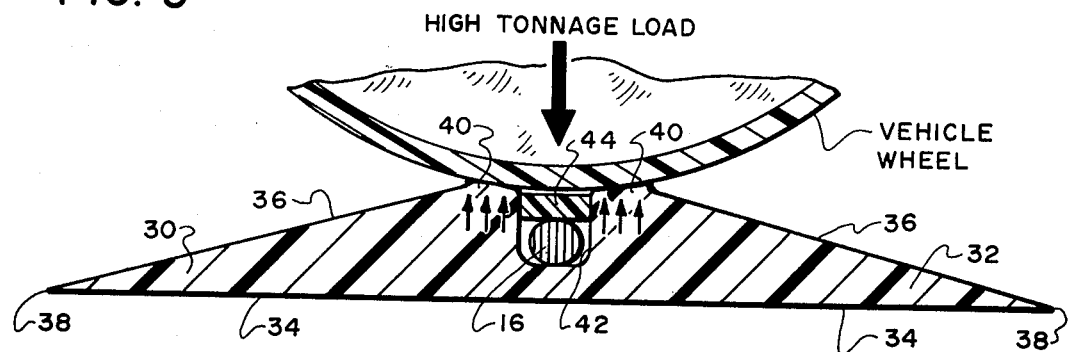
FIG. 3
FIG. 4

HIGH STRENGTH PORTABLE CABLE CROSSOVER FOR HIGH TONNAGE EARTH MOVING VEHICLES

CONTINUITY

This application is a division of our copending U.S. patent application Ser. No. 383,644, filed July 30, 1973, now U.S. Pat. No. 3,888,186, issued June 10, 1975.

BACKGROUND

1. Field of Invention

This invention relates generally to cable protectors for earth moving vehicles and more particularly to portable cable crossovers of high strength resinous material to withstand high tonnage loads of earth moving vehicles such as those used in open pit mining. The present invention is intended especially for use with electric cables required to furnish power to electrically operated excavating machinery used in strip mining and other similar large scale earth moving operations such that the crossover shields the cable from damage due to ground-engaging earth moving loads of many tons, e.g. 200 tons which traverse the crossover.

2. Prior Art

In large scale strip mining operations, it is common practice to use electrically powered excavating machines, all supplied with electrical energy from one or more primary sources. In this regard, a serious problem has been encountered in communicating the electricity from the source to the excavating machine and at the same time providing access for high tonnage earth moving vehicles between the excavating machine where the vehicles are loaded with earth, and a suitable dump site. One proposed solution has been to use temporary power poles which engage the ground at one end and form a bridge between which the cable spans at an elevation substantially above the ground. The elevations to which such poles must extend are substantial since the earth moving vehicles in question extend above the ground on the order of 20–25 feet. Consequently, if the poles are not imbedded in the ground, wind and other forces of nature frequently cause them to fall to the ground decreasing the efficiency of the mining operation and risking property damage and personal injury frequently caused when a high tonnage earth moving vehicle runs directly across an electric cable of the type needed for the mentioned excavating machinery. On the other hand, any installation of the type mentioned, is temporary since excavation sites vary rather rapidly. Hence, it is uneconomical to anchor one end of the power poles into the ground to the extent necessary to resist loads imposed by nature. In addition, it has been found that earth moving vehicles commonly strikes such poles. It has also been proposed that the required electric cable be placed upon the ground and shielded by high strength metal crossovers in one fashion or another. This approach has proved disadvantageous since the high tonnage earth moving vehicles tend to impose their load along two narrow areas of the metal crossovers causing them to curl or bow. Thereafter, continued use of curled or bowed steel crossovers poses an undue hazard to equipment and personnel.

BRIEF SUMMARY AND OBJECTS OF THE INVENTION

The present invention overcomes the described disadvantages of the prior art and provides a movable portable cable crossover of high strength resinous material which accepts the electric cable in a central open top recess. The cable crossover engages the ground along its bottom surface and defines front and back ramps which are engaged by the wheels of the earth moving vehicles. Opposed shoulders central of the crossover adjacent the recess transfer the vehicle loads to the ground without substantial displacement. Deflection has been found to be minimal and no part of loads, which are frequently in excess of 200 tons, is imparted to the cable. The crossover is uneffected by acts of nature and does not permanently deform, the memory of the crossover causing it to immediately return to its initial non-load shape once it has been traversed by an earth moving vehicle. A strip insert above the cable in the recess shields the cable from the weather and from damage due to debris and allows easy cable removal when the crossover is to be transported to another location. Also, the strip insert "pops" rocks out of superposition on the strip after the vehicle tires traverse the crossover whereby the compression of each rock into the strip flips each rock away from the crossover site. A towbar or tow chain fixedly anchored to one or both ends of the crossover allows a towing vehicle to connect to the crossover and drag it along the ground from one site to another.

Accordingly, it is a primary object of the present invention to alleviate the difficulties heretofore encountered in allowing high tonnage earth moving vehicles to cross electric cables by providing an elastomeric cable crossover which accepts and protects the cable from damage.

It is another important object of the present invention to provide a movable cable crossover which is not affected by acts of nature, requires little or no maintenance and which has a relatively low initial cost.

It is another significant object of the present invention to provide a cable crossover having a unique configuration comprising front and back ramp sections, an open top recess and shoulders on opposite sides of the recess to withstand high loads imposed by earth moving vehicles.

It is an additional object of the present invention to provide an improved cable crossover having a central open top recess for receiving an electric cable and a strip insert to be placed within the recess above the cable.

It is also a principal object of the present invention to provide an improved cable crossover having tow structure connected at one or both ends to accommodate dragging of the crossover from place to place.

These and other objects and features of the present invention will be apparent from the following detailed description, taken with reference to the accompanying drawings.

BRIEF DESCRIPTION OF DRAWINGS

FIG. 1 is a perspective representation of a presently preferred cable crossover embodiment with an electric excavating shovel and a high tonnage earth moving vehicle illustrated as line drawings and at a reduced scale;

FIG. 2 is a longitudinal cross-sectional view taken along lines 2—2 of FIG. 1;

FIG. 3 is a cross-sectional representation taken along lines 3—3 of FIG. 1;

FIG. 4 is a cross-sectional view similar to FIG. 3 showing the manner in which a load is imposed upon and resisted by the FIG. 1 embodiment;

DETAILED DESCRIPTION OF THE ILLUSTRATED EMBODIMENT

Figure 5:
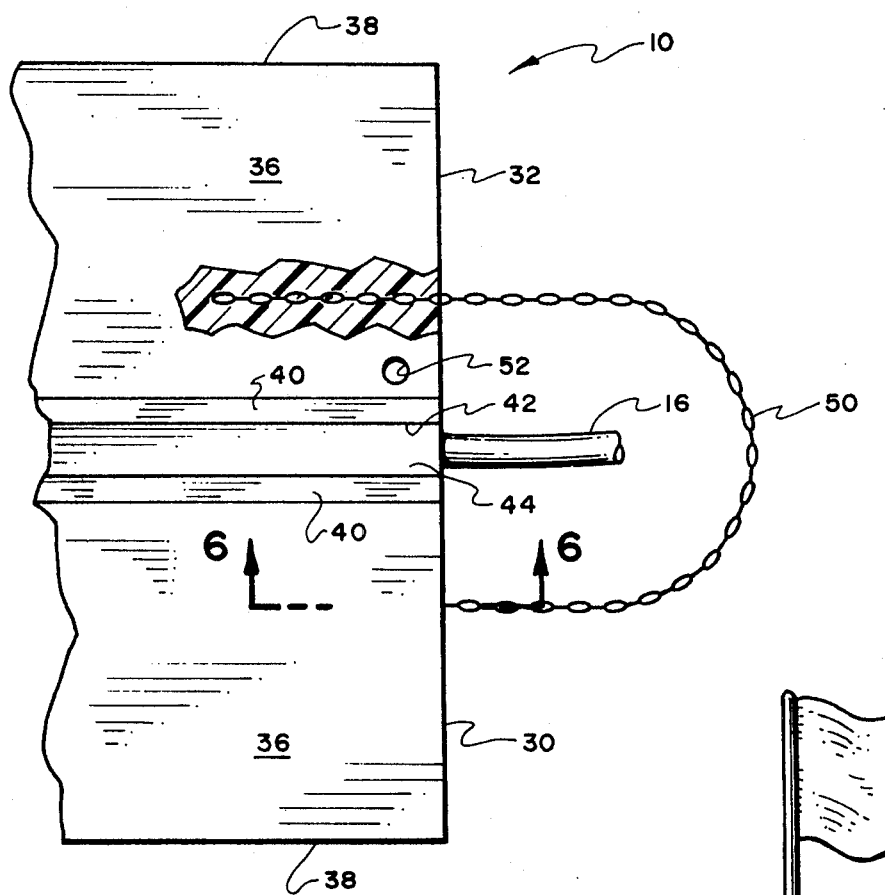
FIG. 5 is a plan view of an alternative towing structure arrangement illustrating a tow chain with the ends thereof imbedded in the elastomeric crossover.

Reference is now made to the drawings which illustrate a presently preferred embodiment of the present invention. Specifically, a portable elastomeric crossover pad, generally designated 10 is composed of high strength molded resinous material, such as solid polyurethane. Preferably, the urethane is poured while in liquid form into a mold constituting the complement of the top surface. If desired, fabric or metal mesh reinforcement 12 (FIG. 3), preferably nylon or polyester, may be imbedded in the liquid urethane. This is best accomplished by pouring a portion of the liquid urethane, placing the mesh on top of the partial pour and making an additional pour over the mesh. This may be repeated until an ample number of reinforcing layers exist in the resin. The consistency of the resin will sustain relatively small gauge metal mesh reinforcement. Naturally, other forms of reinforcement could be used and, if desired, the urethane alone can comprise the pad crossover 10. Once cured, the pad is utilized as a means of permitting a high tonnage earth moving vehicle to move across electric cable 16 running from a power source 18 to an electric excavator such as shovel 20.

Figure 6:
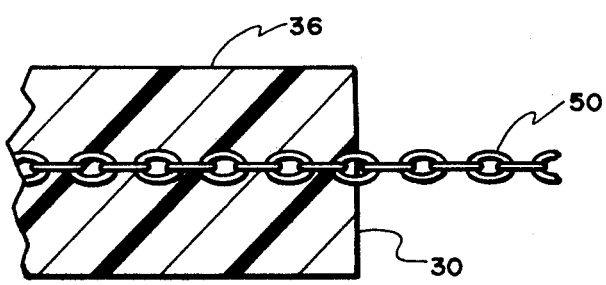
FIG. 6 is a cross-sectional view taken along lines 6—6 of FIG. 5.

As can be seen from inspection of FIG. 1, the crossover pad 10 is intended to be placed flat upon the ground in the path of the high tonnage earth moving vehicle 14. The crossover 10 is conveniently located in any desired position and moved from one position to another by merely removing the cable 16 from its relationship with the crossover 10 and pulling along the ground the crossover to the location desired. This is facilitated by utilization of a tow structure comprising towbar 22 (FIGS. 1-3) and/or tow chain 50 (FIGS. 5 and 6). Towbar 22 may comprise a rigid steel plate bonded by a suitable adhesive to the bottom side of the crossover 10 along one or both ends 24 thereof. The towbar 22 is shown as being slightly wider than the crossover, as having tapered edges 26 at the exposed end and an elongated eyelet 28 in which a tow hook at the end of a tow cable or the like may be placed by means of which a tow vehicle may drag the crossover as desired across the ground. Tow chain 50 may comprise a heavy duty steel chain of sufficient strength to sustain dragging of the crossover from place to place. The ends of the chain are imbedded into the body of elastomeric material as the crossover is being formed so that the ends are centrally located between the top and bottom of the crossover. A chain may be placed at one or both ends and, when the elastomeric material is cured adherence to the chain accommodates dragging of the crossover from one excavation site to the next.

Disregarding the presence or absence of reinforcement, the crossover per se comprises a solid body of material comprising opposed ramps 30 and 32. Each ramp comprises a bottom, generally horizontal surface 34 and a top tapered surface 36 which is inclined upwardly from opposed edges 38.

Each ramp merges with a central portion of the crossover comprising a top horizontal surface or shoulder 40 between which is located a U-shaped recess 42. Recess 42 is a channel comprised of spaced vertical walls and a horizontal base wall with fillet corners therebetween. The electrical cable 16 is situated within the recess and rests upon the base thereof. The top of the cable is preferably sufficiently low in the recess that a strip insert 44 having a width slightly greater than the width of the recess is force fit into the recess above the cable. In this way debris such as small pieces of excavation will not accumulate on top of the cable, which might well damage the cable and would be compressed upon the cable by the vehicle loads passing over the crossover making it difficult to remove the cable from the recess. Compressive action of the vehicle upon rocks, which from time to time rest on the strip, "pops" each rock from the strip site. It is to be appreciated that the strip insert 44 does not assume any significant part of the vehicle load, the same being transmitted to the ground by the two shoulders and the two ramps when contacted by vehicle wheels, as shown best in FIG. 4. It is presently preferred that the strip 44 comprise neoprene elastomeric material.

Figure 7:
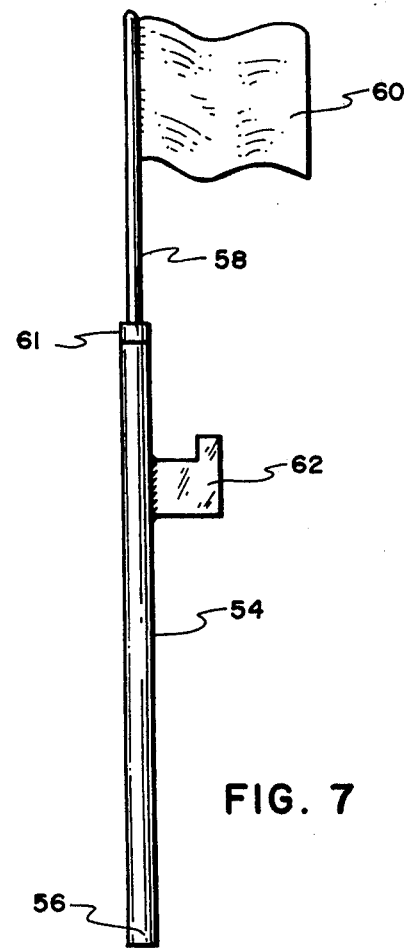
FIG. 7 is a front elevation of an end warning flag holder adapted to fit in an end aperture of the crossover of FIG. 5.

The crossover 10 may comprise an aperture 52 at one end, but preferably at both ends. A standpipe 54 (FIG. 7) is adapted to fit snugly at its lower end 56 within aperture 52 so that, when so inserted, the standpipe 54 is vertically erect. The standpipe 54 is centrally hollow at least at the top to receive a post 58 to which a flag 60 is attached. A collar 61 limits the distance the post 58 extends into the hollow of the pipe 54. Thus, with a flag so positioned at each end of the crossover, the vehicle operator is better able to judge where the vehicle should be driven across the crossover.

An L-shaped bracket 62 is welded or otherwise suitably secured to the outside wall of the standpipe 54 to receive the exposed loop of chain 50 thereby keeping the same from being imbedded into the ground or damaged.

It has been found that the crossover must be of a length of at least 8 feet and the durometer hardness of the synthetic resinous material must be sufficient to support loads in excess of 100–200 tons imposed by earth moving vehicles of the type under consideration. The crossover as described above provides a configuration which has been found to be surprisingly effective as a cable crossover for electric excavators permitting ultraheavy loads to pass repeatedly thereover without causing permanent deformation or failure of any kind. Once the crossover pad has been fabricated, there is virtually no cost of installation and the item is virtually maintenance free. It can be moved from place to place using available equipment in a relatively short period of time and requires only nominal man hour investment. No cable damage has been experienced when using the present invention.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters patent is:

1. A combination comprising:
   an electrically powered excavator;
   a ground-engaging portable cable crossover for out-of-doors use with heavy load earth moving vehicles weighing many tons when loaded comprising:
   a unitary one piece body of molded synthetic resinous material having a durometer hardness sufficient to support excavating vehicle loads of many tons;
   said body comprising:
      feathered front and back edges, each edge being defined by said material disposed in the form of an acute angle tip;
      front and back tapered ramps, respectively extending from the tip of each edge toward the center of the body and defining a horizontal flat continuous load bearing bottom surface, and angular top surface which diverges from the bottom surface in an inward direction and a solid interior between said bottom and top surfaces;
   a central solid portion comprising said one piece body so as to be integral with each tapered ramp and bridging therebetween having a width substantially less than the width of either ramp, the center portion comprising a central horizontal flat continuous load bearing bottom surface linearly connecting the two ramp bottom surfaces one to the other thereby creating a continuous horizontal load bearing crossover bottom surface and spaced top shoulders respectively angularly joined to the angular top ramp surfaces and a U-shaped recess the surface of which connects one top shoulder to the other, the U-shaped recess running the full length of the crossover for receiving an electrical cable at the bottom thereof, said recess having a vertical depth substantially greater than the diameter of the cable, the spaced top shoulder and the solid material thereunder withstanding the load of high tonnage ground-engaging vehicles when displaced across the crossover without deflection or destruction of said shoulders such as would impose vehicle load on the cable in the recess.

* * * * *